United States Patent [19]
Rigney

[11] Patent Number: 5,438,790
[45] Date of Patent: Aug. 8, 1995

[54] BALANCED ARTIFICIAL BAIT

[76] Inventor: Jan J. Rigney, 12109 E. 76th St., North, Owasso, Okla. 74055

[21] Appl. No.: 882,364

[22] Filed: May 6, 1992

Related U.S. Application Data

[63] Continuation of Ser. No. 679,761, Apr. 3, 1991, abandoned.

[51] Int. Cl.⁶ ............................................. A01K 85/00
[52] U.S. Cl. .................................................. 43/42.24
[58] Field of Search ................. 43/42.24, 42.22, 42.28, 43/42.26, 42.27

[56] References Cited

U.S. PATENT DOCUMENTS

| | | | |
|---|---|---|---|
| 2,129,245 | 9/1938 | Stenstrom | 43/42.26 |
| 2,231,949 | 2/1941 | Rinehart | 43/42.27 |
| 2,797,519 | 7/1957 | Keller | 43/42.24 X |
| 3,940,869 | 3/1976 | Roberts | 43/42.24 X |
| 4,926,578 | 5/1990 | Morse | 43/42.24 |

*Primary Examiner*—Mark Rosenbaum
*Assistant Examiner*—Chuck Y. Mah
*Attorney, Agent, or Firm*—Frank J. Catalano; Scott R. Zingerman

[57] ABSTRACT

An artificial bait is provided for use with a typical fishing hook or jig in which the hook or jig has an average density greater than the average density of water while the artificial bait has an average density less than the average density of water so that the hook tends to sink and the bait tends to float. The volume of the bait is proportioned to the volume of the hook so that their average density taken together slightly exceeds the average density of the water so that the hook and the bait together sink relatively slowly in the water. The bait is shaped to simulate a natural bait and is slidably engaged on the hook in a fashion similar to that in which a natural bait would be secured to the hook. As the hook and bait slowly sink, free portions of the bait extend upwardly toward the water surface and continue to respond to water currents and motion to maintain the tantalizing quality of the bait. The result is a rig of weight suitable for accuracy and distance in casting and yet so counterbalanced for buoyancy as to provide a minimal rate of descent in the water. By selection of a suitable absorbent material for the bait body, a selected bait and hook may be dipped in the water before casting so as to increase its casting weight without changing its descent rate.

5 Claims, 1 Drawing Sheet

BALANCED ARTIFICIAL BAIT

This is a continuation of application Ser. No. 07/679,761 filed on Apr. 3, 1991, now abandoned.

BACKGROUND OF THE INVENTION

This invention relates generally to artificial bait used in fishing and more particularly concerns baits intended to be fished by casting.

Two key parameters of effective bait casting are distance and accuracy and, consequently, ultimate casting performance is limited by the weight and surface area of the bait to be cast. That is, the lighter the weight and the greater the surface area of the bait cast, the greater impact air resistance will have upon the distance and accuracy of the cast. This problem is, of course, further compounded by meteorological conditions such as wind velocity and moisture content in the air.

While increased weight and reduced surface area enhance the casting characteristics of a bait, such features also have a negative effect on the operation of the bait on the surface of or in the water. Lacking a countervailing force, a heavier bait of lesser surface area tends to sink more rapidly and is more likely to sink to bottom, thus diminishing the tantalizing quality of the bait.

In compromising these considerations to achieve acceptable results, fishermen generally use weights to increase casting distance and accuracy as well as to cause the bait to sink and use floats to counter the weight so as to restrict the level to which or speed at which the bait will sink.

This counterbalancing of weights and floats results in a relatively complex array of tackle combinations which take time to rig and produce less than desired results in terms of bait simulation in the water. Most significantly, in situations where the angler desires for the bait to fall from the surface to the bottom at a very slow rate of descent so as to tantalize a fish at any depth therebetween into striking the bait, the counterbalanced relationship is so sensitive that minimal variations in any component prevent achievement of the desired effect. That is, should the average density of the entire rig be less than the average density of water, the rig as a whole must float, though the bait can reach a depth limited by its mechanical connection within the rig. On the other hand, if the average density of the rig significantly exceeds the density of water, the rig as a whole is going to sink at a more than desirable rate of descent. Thus, in compensating or modifying the rig to achieve desirable casting distance and accuracy in given individual situations, it is virtually impossible for the angler to maintain the appropriate counterbalanced relationship to achieve very low rates of descent.

It is, therefore, an object of this invention to provide an artificial bait which, in combination with a hook, sinks at relatively low rates of descent. It is also an object of this invention to provide an artificial bait which, in combination with a hook, sinks at relatively low rates of descent without use of a separate flotation device. Another object of the present invention is to provide an artificial bait of absorbent material which substantially homogeneously exhibits an average density at least slightly less than that of water. A further object of this invention is to provide an artificial bait exhibiting slow descent characteristics while facilitating accuracy and distance in casting.

SUMMARY OF THE INVENTION

In accordance with the invention an artificial bait is provided for use with a typical fishing hook or jig. The hook or jig has an average density greater than the average density of water while the artificial bait has an average density less than the average density of water. Thus, the hook tends to sink and the bait tends to float. However, the volume of the bait is proportioned to the volume of the hook so that their average density taken together slightly exceeds the average density of the water so that the hook and the body together sink relatively slowly in the water. The bait is shaped to simulate a natural bait and is slidably engaged on the hook in a fashion similar to that in which a natural bait would be secured to the hook. As the hook and bait slowly sink, free portions of the bait extended upwardly as the bait body seeks the water surface. Thus, as the entire rig descents, the extended portions of the bait continue to respond to water currents and motion to maintain the tantalizing quality of the bait. This action continues even as the denser-than-water hook reaches bottom since the less-dense-than-water bait continues to extend toward the water surface.

Appropriate coordinated choices of bait and hook will result in rigs of weight suitable for accuracy in distance and casting and yet so counterbalanced for buoyancy as to provide a minimal rate of descent in the water.

Furthermore, by selection of a suitably absorbent material for the bait body, a selected bait and hook may be dipped in the water before casting so as to increase the casting weight of the rig by the weight of the water absorbed by the bait. Since the desired increase in weight for casting is the result of absorption of water, entry of the bait into water will still produce the anticipated slow rate of descent. That is, since it is water that is used as the added weight to improve casting characteristics, the addition of the weight has no impact whatsoever on the buoyancy of the rig when it is immersed in water.

This bait may also be soaked with a quantity of fish attracting scent which, since it is absorbed into the bait, lasts considerably longer than scents applied to surface of substantially nonabsorbent baits.

BRIEF DESCRIPTION OF THE DRAWINGS

Other objects and advantages of the invention will become apparent upon reading the following detailed description and upon reference to the drawings in which.

Figure 1:
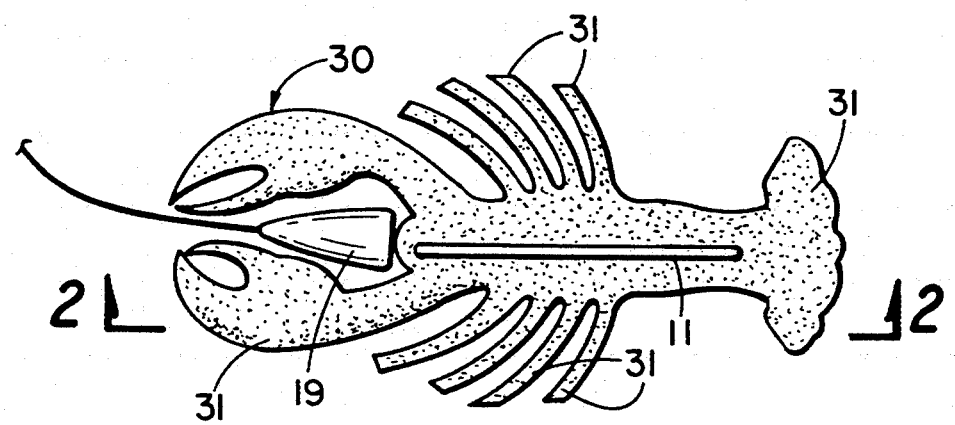
FIG. 1 is a top plan view of a crawfish embodiment of the present artificial bait used with a jig.
Figure 2:
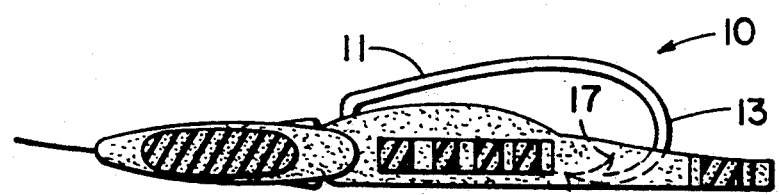
FIG. 2 is a cross-sectional view taken along the line 2—2 of FIG. 1.
Figure 3:
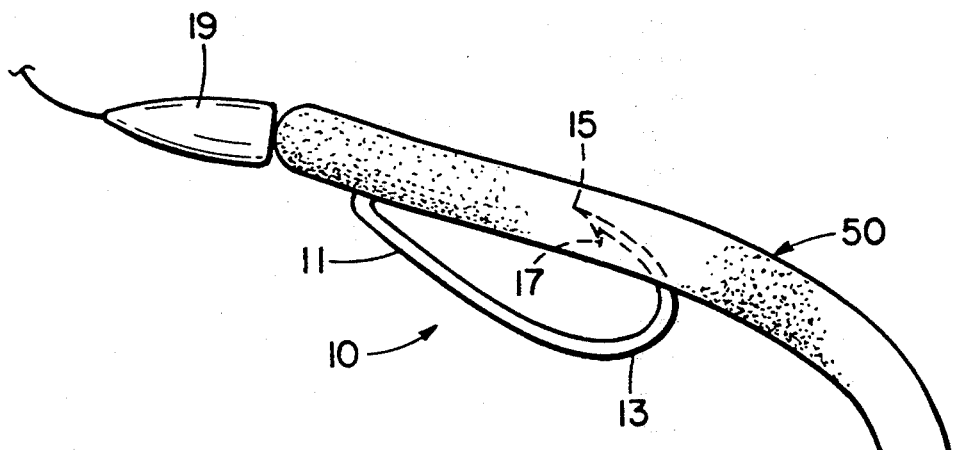
FIG. 3 is a side elevational view of a worm embodiment of the present artificial bait used with a jig.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning to the drawings, two embodiments of the artificial bait used in conjunction with a typical hook or jig are illustrated. As used herein, the terms hook and jig are intended to embrace and include modification or additions such as weights, sinkers, worm weight or other devices added to the hook or jig to increase its average density.

The hook or jig 10 consists generally of a shank 11 at one end and a bend 13 at the other end which extends to a point 15 and a barb 17 defining a gap across the hook or jig 10. The shank end, in the case of the jig 10, is provided with a head 19, the weight of which is selected by the angler for a given set of fishing conditions.

As shown, the bait to be used in association with the hook or jig may take the form of a crawdad 30 or a worm 50 or a, minnow, frog, or any other natural bait desired by the angler. Of key significance to the present invention, the bait is formed of a substantially homogeneous less-dense-than-water material. The hook or jig 10, of course, is generally formed from steel or steel and lead or other suitable more-dense-than-water material. The volume of material used in the bait is coordinated with or proportioned to the volume of material in the hook or jig such that the average density of the hook or jig 10 together with the bait 30 or 50 is slightly greater than the average density of water. Therefore, in a coordinated arrangement of bait 30 or 50 and hook or jig 10, the bait 30 or 50 tends to float or rise to the surface while the hook or jig 10 tends to sink or descend to the bottom, but the combination is so arranged so that the hook or jig 10 and bait 30 or 50 taken together in a single rig slowly descend from the surface to the bottom.

As shown, the bait 30 or 50 is slidably engaged by the angler on the hook 10 in a fashion similar to that by which a natural bait would be engaged on the hook 10. Preferably, the material is flexible enough that, as the bait 30 or 50 slowly sinks with the hook or jig 10, the free portions of the bait 31 or 51 extend toward the surface of the water while the combination descends toward the bottom. In this condition, the free portions 31 or 51 tend to move and fluctuate with the water movement and currents, providing an enticing bait not only during descent, but also when the rig has reached the bottom. As the hook or jig 10 tends to ride on the bottom, the free portions 31 or 51 of the bait 30 or 50 remain in their upwardly extended condition, causing the bait 30 or 50 to walk or move along the bottom surface.

Preferably the material is also absorbent, so that once the rig is connected to the line, it may be dipped in water to add weight sufficient to accomplish the desired degree of distance and accuracy in casting. Since the weight that is added to the bait consists of the medium into which the bait is to be cast, that is, water, the weight is effective to produce distance and accuracy casting and yet has no impact whatsoever on the operation of the bait within its medium.

The absorbent material also permits the fisherman to soak the bait in a liquid scented substance intended to attract fish. Since the bait soaks up the substance, the scenting quality lasts considerably longer in the water than is the case with nonabsorbent baits which have the scenting substance merely applied to their surface.

The following is a schedule of tested materials, including the approximate proportionate relationship between the material and the hook, which have been found effective to produce the approximate desirable rates of descent as indicated. It will be noted that these rates of descent are significantly less than the rates of descent of baits presently available on the market, the slowest presently available but exhibiting a rate of descent in the range of two feet per second compared to a rate of descent in the order of 0.25 feet per second and significantly far for the bait herein disclosed.

| BAIT MATERIAL | HOOK WEIGHT (OZ) | DRY BAIT WEIGHT (GMS) | DESCENT RATE FT/SEC | FLOTATION TIME (SEC) |
| --- | --- | --- | --- | --- |
| UNIROYAL | 1 | 1.0 | 0.25 | NEGLIGIBLE |
| ENSOLITE MFC-2 | 3/4 | 0.67 | 0.33 | |
| VINYL NITRATE | 1/2 | 0.6 | 0.25 | |
| | 1/4 | 0.25 | 0.33 | |
| UNIROYAL | 1 | 1.2 | 0.21 | NEGLIGIBLE |
| ENSOLITE MFC-G | 3/4 | 0.75 | 0.28 | |
| VINYL NITRITE | 1/2 | 0.67 | 0.27 | |
| | 1/4 | 0.3 | 0.33 | |
| UNIROYAL | 1 | 1.12 | 0.26 | NEGLIGIBLE |
| ENSOLITE LPC | 3/4 | 0.75 | 0.22 | |
| VINYL NITRATE | 1/2 | 0.65 | 0.29 | |
| | 1/4 | 0.3 | 0.29 | |
| GRAY #90 | 1 | 3.0 | 0.37 | 2.2 |
| | 3/4 | 2.5 | 0.36 | 4.2 |
| 1.8 DENSITY POLY-URETHANE | 1/2 | 2.5 | 0.21 | 18.0 |
| | 1/4 | 1.8 | 0.29 | 40.0 |

It should be noted that, for example, an increase in dry bait weight of only 0.025 gm to 0.775 gm of MFC-G with a ¾ oz hook produced a descent rate of 0.10 feet per second and an increase of 0.7 grams to 2.5 grams of Gray #90 with ¼ oz hook produced a descent rate of 0.02 feet per second.

Thus, it is apparent that there has been provided, in accordance with the invention, an artificial bait that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in combination with a hook having an average density greater than the average density of water, an artificial bait comprising a substantially homogeneous flexible absorbent body slidably engagable on at least a portion of said hook and shaped to simulate a natural bait, said body having an average density less than the average density of water, the volume of said body being proportioned to the volume of said hook such that the average density of said hook and said body taken together slightly exceeds the average density of water, whereby said hook and said body together sink relatively slowly in the water and free portions of said flexible body extend toward the water surface.

2. For use in combination with a hook having an average density greater than the average density of water, an artificial bait comprising a substantially homogeneous flexible absorbent body slidably engagable on at least a portion of said hook and shaped to simulate a natural bait, said body having an average density less than the average density of water, the volume of said body being proportioned to the volume of said hook such that the average density of said hook and said body, when wet, taken together slightly exceeds the average density of water, whereby said hook and said body together sink relatively slowly in the water.

3. For use in combination with a hook having an average density greater than the average density of water, an artificial bait comprising a substantially homogeneous flexible body slidably engagable on at least a portion of said hook and shaped to simulate a natural bait, said body having an average density less than the average density of water, the volume of said body being proportioned to the volume of said hook such that the average density of said hook and said body taken together slightly exceeds the average density of water, whereby said hook and said body together sink relatively slowly in the water.

4. For use in combination with a hook having an average density greater than the average density of water, an artificial bait comprising a substantially homogeneous flexible body slidably engagable on at least a portion of said hook and shaped to simulate a natural bait, said body having an average density less than the average density of water, the volume of said body being proportioned to the volume of said hook such that the average density of said hook and said body taken together slightly exceeds the average density of water, whereby said hook and said body together sink relatively slowly in the water and free portions of said flexible body extend toward the water surface.

5. For use in combination, a sinking hook or hook and weight, having an average density greater than the average density of water, and a buoyant artificial bait comprising a substantially homogenous flexible buoyant body, slidably engaged on at least a portion of said hook and shaped to simulate a natural bait, said buoyant body having an average density less than the average density of water, the volume of said buoyant body being proportioned to volume of said sinking hook or hook and weight such that the average density of said sinking hook or hook and weight and said buoyant body taken together, slightly exceeds the average density of water, whereby said sinking hook, or hook and weight, and said buoyant body together sink at a consistent, repeatable, slow, rate of descent in the water, that rate of descent being determined by the ratio of the buoyance of the buoyant body to the density of the sinking hook or hook and weight, and free portions of said flexible buoyant body extend toward the surface.

* * * * *